Figure 1:
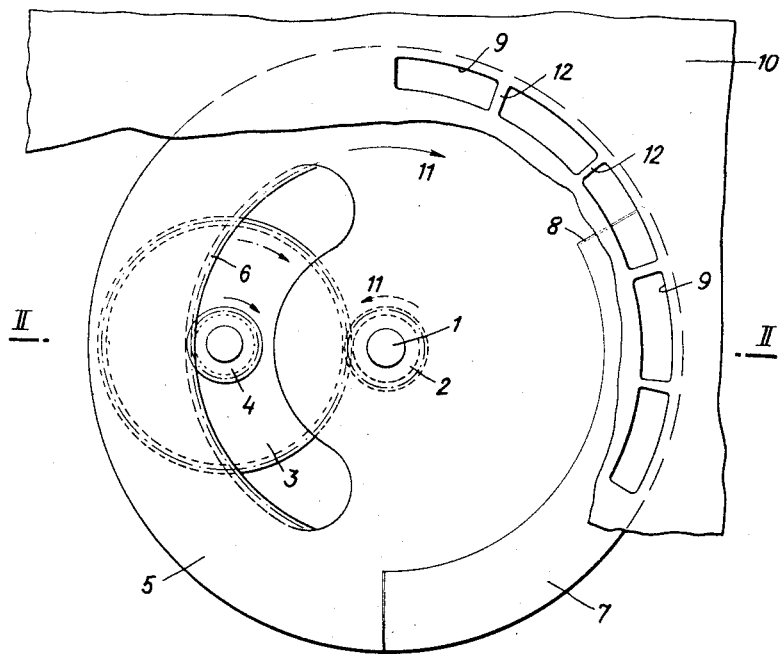

May 19, 1959   G. MALEK   2,887,182
MOTION PICTURE CAMERA
Filed Sept. 30, 1957

GEORG MALEK
INVENTOR.

BY Wenderoth, Lind & Ponack
Attys

United States Patent Office 2,887,182
Patented May 19, 1959

2,887,182
MOTION PICTURE CAMERA

Georg Malek, Vienna, Austria, assignor to Eumig Elektrizitats- und Metallwaren-Industrie, Vienna, Austria Application September 30, 1957, Serial No. 687,221

Claims priority, application Austria September 28, 1956

6 Claims. (Cl. 185—44)

In a motion picture camera comprising a spring drive the running-down range of the drive when the same has been wound up once is smaller in most cases than the total length of the film supply contained in the camera. In any case the useful running-down range of the spring drive when the same has been wound once must correspond to the length of film which is to be fed during the longest usual shooting period. However, the entire running-down range will be utilized only in very rare cases in one shot. For the sake of safety, however, the spring mechanism must be completely wound in order to avoid a premature interruption of the shot when the spring drive has completely run down. This applies to those cases in which the running down of the spring drive is not limited—in this case the spring tension required to ensure the correct frame frequency is no longer available in the last part of the running-down movement so that the pictures are over-exposed—as well as to those in which the running-down movement is limited to preclude that last phase of the running-down movement of the spring, which phase constitutes a source of error. In all these known arrangements the spring mechanism is damaged by being wound almost permanently to full tension. It has already been proposed to couple a counter with the spring drive, which counter indicates by numbers appearing in a window the metres of film length for which the spring drive is still sufficient. The numbers appearing in the window are arranged throughout the periphery of a counting disc. Such a counter enables a reading of the length of the available running-down range of the spring drive only before the shot has begun, i.e., when the camera is at a standstill, whereas it does not enable a convenient observation nor an observation during the shot.

It is an object of the invention to eliminate these disadvantages. The invention resides in that in such a motion picture camera comprising an indicating member which is coupled to the drive and which indicates the available useful running-down range of the spring drive, this indicating member is formed by a rotary disc, which consists particularly of a gear-wheel mounted coaxially with the spring drive, and which is so coupled to the drive that it performs, at most, half a rotation during the entire running-down range of the drive, which disc carries a preferably coloured surface marking, which is visible from the outside and extends throughout the angular range of the disc which corresponds to the running-down range of the spring drive, and that windows are arranged along an arc in the camera casing, which extend over that angular range of the disc which corresponds to the running-down range of the spring drive, the lands between these windows representing suitably a scale graduated, e.g., in metres of film length to be fed. The combination of these features enables a convenient and conspicuous observation of the available useful running-down range of the spring drive. The indicating device shows at first sight, also during the operation of the camera, which running-down range is available, so that the amateur can perform the shot in accordance therewith. In most cases the scenes and actions which are filmed cannot be repeated, and the use of the available running-down movement must be planned. In the case of a competition, a ski race, etc., there is no time for winding the camera and the amateur must manage to get on the film everything which he can no longer shoot a quarter of a minute or half a minute later. He can do this only if he has on his camera such a very conveniently observable indicating device for the available running-down range. This convenient observation is enabled by the fact that the disc carries a preferably coloured surface marking, which extends throughout that angular range of the spring drive. It is also important that this disc be visible in windows arranged along an arc because it is easy to note the number of windows over which the marking extends whereas it is impossible during the shooting or during the observation of the scenes to be shot to check a number which appears in a window. Such a surface marking will be possible only if the rotary disc is so coupled to the drive that it performs, at most, half a rotation during the entire running-down range of the drive. If the rotary marking disc would perform more than half a rotation during the entire running-down range of the drive, the marking which may be coloured, would reappear in the first windows before it disappears in the last of the windows arranged along an arc. Special advantages are afforded in this connection by the fact that the rotary marking disc is rotatably carried mounted coaxially with the spring drive because this enables the provision of a relatively large marking disc and the arrangement of the windows on a correspondingly large circle so that the indication is more convenient and more conspicuous. In the case of such a coaxial arrangement the entire diameter of the spring drive can be utilized for the indicating disc and the arc of windows whereas in the case of an arrangement of different axes the available area of the casing surface of a substandard film camera could accommodate only a much smaller arc of windows and a much smaller disc.

The invention is diagrammatically illustrated in the accompanying drawing with reference to an embodiment shown by way of example.

Figure 2:
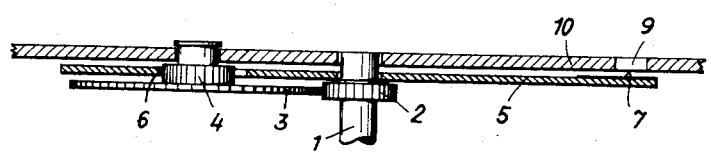

Fig. 1 shows a side wall of the camera casing which is partly cut open to make the disc visible which represents the indicating member. Fig. 2 is a sectional view taken on line II—II of Fig. 1.

1 represents a shaft of the spring drive, e.g. the shaft of the spring casing. This shaft carries a pinion 2 in mesh with a gear-wheel 3, which is coaxially connected to a pinion 4. A disc 5 is rotatably carried on the shaft 1 and has an internal toothed sector 6 in mesh with the pinion 4. As a result, the speed of the disc 5 is so reduced that this disc performs only half a rotation throughout the useful running-down range of the spring drive.

A surface marking 7 is provided on part of the periphery of this disc and extends to a limit 8. This surface marking may have any desired colour. Windows 9 are arranged along an arc in the wall of the camera casing 10 in the range of this surface marking so that the limits 8 of the surface marking 7 are permanently visible. The running-down direction of the spring drive is indicated by arrows 11.

When the spring drive is completely wound up, all windows expose the surface marking 7 and show its colour. As soon as the running-down movement begins, the limit 8 of the surface marking 7 travels slowly past these windows 9 in the clockwise sense and it is distinctly visible which windows are still coloured (surface marking 7). This enables a conclusion to be drawn as to the available running-down range of the spring drive.

The windows 9 may be so designed, e.g., that the lands 12 between these windows form graduations of a scale. For instance, when the length of each window 9 corresponds to 1 metre of film length, the illustrative embodiment shown in the drawing would have a spring drive having a running-down range of 5 metres film length. Because more than 1.5 metres or 2 metres are hardly required for one shot, it is sufficient to wind up the drive until the first two windows (the two left-hand windows 9) appear coloured owing to the surface marking 7. When the limit 8 of the surface marking 7 reaches the end of the last window the drive has reached the end of its useful running range and when it is desired to shoot motion pictures during a certain time the drive may then be wound until the limit 8 indicates the length desired for the shot, whereafter the drive is permitted to run down to the end of its movement.

What I claim is:

1. In a motion picture camera a casing, a spring drive having a limited running-down range, an axle for said spring drive, an indicating member coupled to said drive indicating the available useful running-down range of said drive, said indicating member comprising a rotary disc coupled to said drive causing at most, half a rotation during the entire running-down range of said drive, a marking extending over a part of the surface, corresponding to said useful running-down range, windows in said camera casing along an arc concentric with said rotary disc, the length of said arc corresponding to said useful running-down range, and lands separating said windows, said marking being visible through said windows thereby indicating said available useful running-down range.

2. In a motion picture camera a casing, a spring drive having a limited running-down range, an axle for said spring drive, an indicating member coupled to said drive indicating the available useful running-down range of said drive, said indicating member comprsing a rotary disc coaxial with said axle coupled to said drive causing, at most, half a rotation during the entire running-down range of said drive, a marking extending over a part of the surface corresponding to said useful running-down range, windows arranged in said camera causing along an arc concentric with said rotary disc, the length of said arc corresponding to said useful running-down range, and lands separating said windows, said marking becoming visible through said windows, thereby indicating the available useful running-down range.

3. In a motion picture camera a casing, a spring drive having a limited running-down range, an axle for said spring drive, an indicating member coupled to said drive indicating the available useful running-down range of said drive, said indicating member comprising a rotary disc coaxial with said axle coupled to said drive causing at most, half a rotation during the entire running-down range of said drive, a marking extending over a part of the surface corresponding to said useful running-down range, windows arranged in said camera casing along an arc concentric with said rotary disc, the length of said arc corresponding to said useful running-down range, and lands separating said windows, said marking being visible through said windows, thereby indicating the available useful running-down range, the distance between said lands representing a certain part of said running-down range corresponding to the length unit of the film fed within said part of the running-down range.

4. In a motion picture camera as claimed in claim 1, said marking consisting of a colored surface part of said rotary disc.

5. In a motion picture camera as claimed in claim 2, said marking consisting of a colored surface part of said rotary disc.

6. In a motion picture camera as claimed in claim 3, said marking consisting of a colored surface part of said rotary disc.

References Cited in the file of this patent

UNITED STATES PATENTS

| 1,302,539 | Gullborg | May 6, 1919 |
| 2,443,558 | Frennesen | June 15, 1948 |

FOREIGN PATENTS

| 456,873 | Germany | Mar. 5, 1928 |